Aug. 9, 1927.

A. A. MATHESON 1,638,048

SUGAR BEET SEED DROPPER

Filed March 30, 1926  2 Sheets-Sheet 1

Inventor

Andrew A. Matheson.

By A. J. O'Brien

Attorney

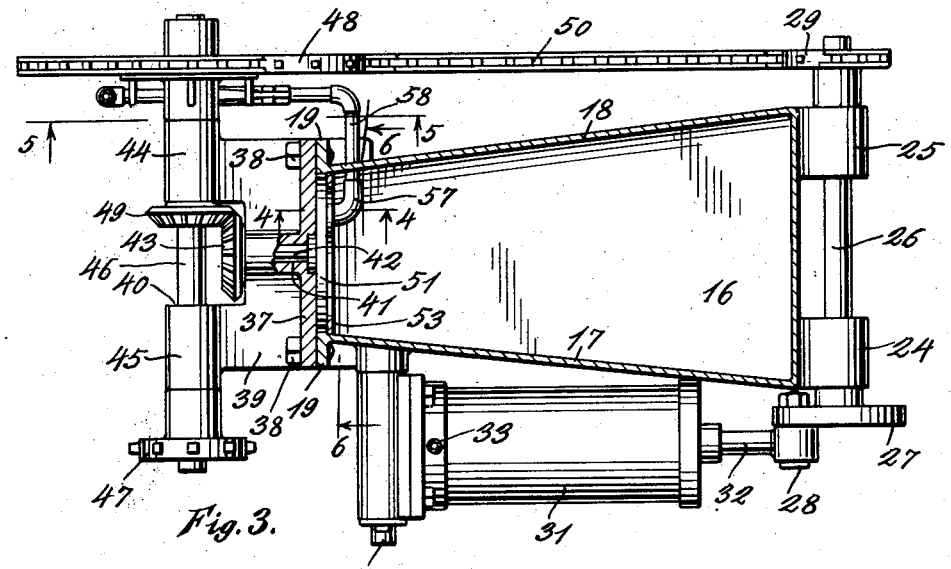
Fig. 3.
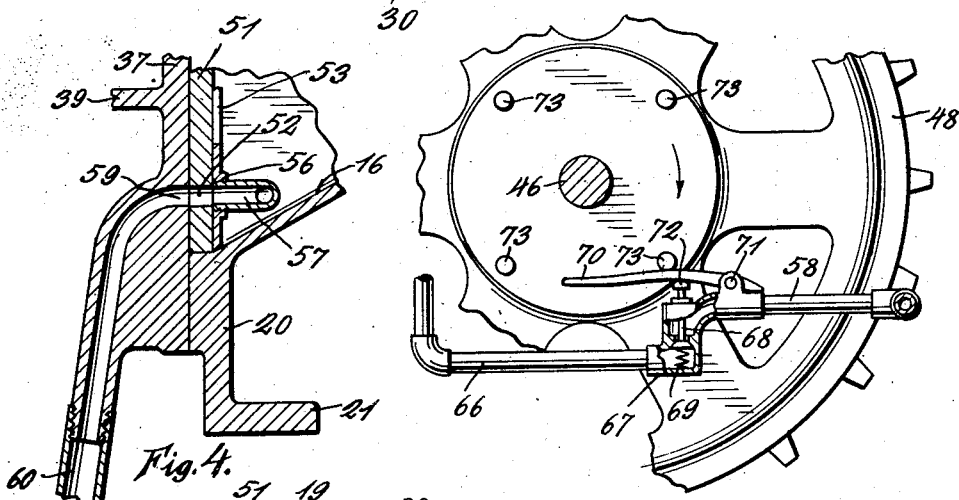
Fig. 4.
Fig. 5.
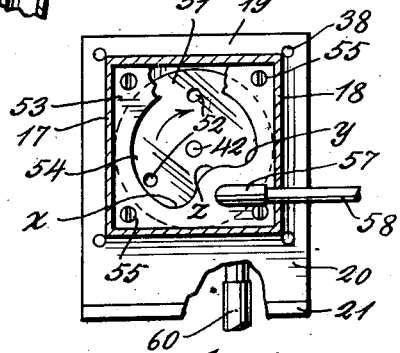
Fig. 6.

Patented Aug. 9, 1927.

1,638,048

UNITED STATES PATENT OFFICE.

ANDREW A. MATHESON, OF DENVER, COLORADO.

SUGAR-BEET-SEED DROPPER.

Application filed March 30, 1926. Serial No. 98,443.

This invention relates to improvements in machines for planting sugar beets.

In the cultivation of sugar beets on a large scale the planting forms an important item of expense which includes the labor charge and the cost of the seed. The labor charge has been reduced to a minimum by the use of planters, which, however, are very extravagant in the use of seed as they merely drill the seed instead of depositing it in hills properly spaced. This method of planting requires several more pounds of seed to the acre than would be required if the seeds were planted in properly spaced hills. When the seeds are "drilled" as is now the custom, it greatly increases the labor and expense of thinning.

It is well known to those versed in the art of raising sugar beets that the best results are obtained when there is a single strong plant at each hill which should be spaced about one foot from each other.

Planters have been made and successively used for planting corn in hills but the same mechanism is unsuited for planting beet seeds. The reason why corn can be successively planted in hills by machinery while beet seed cannot is due to the difference in the seeds. Corn is hard and smooth while beet seeds are rough and of light weight. Beet seeds have a tendency to stick in the machine and are affected by air currents and therefore cannot be depended on to drop altogether the way corn does. This has made it impossible to successively drop beet seeds in hills and has made it necessary to plant the beet seed in drills and to thin by hand after the seeds have come up.

I have found that by the simple expedient of applying compressed air to the seeds at the proper time they will be positively released from the machine and carried with great speed to the seed bed where they will be deposited in close formation whereby it becomes practicable to plant beet seeds in hills.

In order to describe my invention so that it can be readily understood, I shall have reference to the accompanying drawings in which it has been illustrated and in which:

Fig. 3 is a section taken on line 3—3, Fig. 1;

Fig. 4 is a section taken on line 4—4, Fig. 3;

Fig. 5 is a section taken on line 5—5, Fig. 3 and shows portions broken away so as to better disclose the construction; and Fig. 6 is a section taken on line 6—6, Fig. 3.

Figure 1:
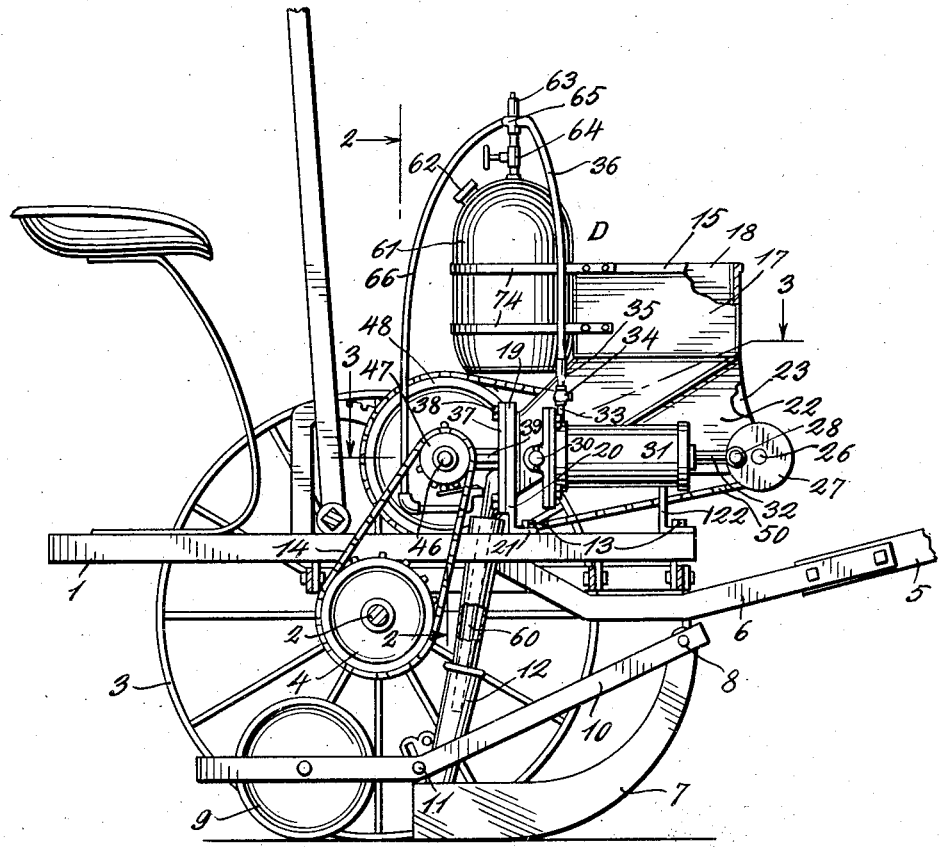
Fig. 1 is a transverse vertical section of a planter constructed in accordance with my invention.
Figure 2:
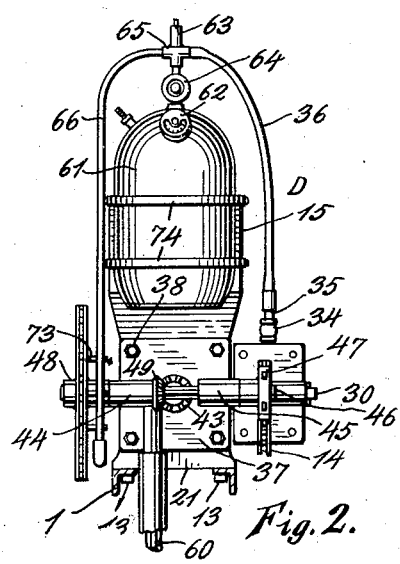
Fig. 2 is an elevation of the attachment taken along line 2—2, Fig. 1.

In Fig. 1 I have shown my improved dropper mechanism applied to an ordinary planter where it has been substituted for the usual dropper mechanism. As my invention relates to the seed dropper and to the combination in which certain parts of the planter form elements, I do not intend to describe the construction of the planter with greater particularity than necessary for the purpose of properly explaining my invention and its mode of operation. The framework 1 of the planter rests upon the axle or shaft 2 to the ends of which the drive wheels 3 are attached. One of the wheels 3 is nonrotatably attached to the shaft 2 to which the sprocket 4 is secured. A tongue 5 is secured to the frame of the machine by means of bars 6. Planting runners 7 are attached to a stationary bracket by means of pivots 8. Pressure wheels 9 are adjustably attached to the runner 7 by means of a frame 10 one end of which is secured to the pivot 8 and which is adjustably clamped to the rear end of the runner 7 by means of a bolt 11. A tube 12 is secured in the space between the two blades of the runner 7 and provides an opening through which the seeds drop. My improved seed dropper, which has been designated as a whole by the letter D is attached to the frame 1 by means of bolts 13 and receives its power from the sprocket wheel 4 through the chain 14. I will now proceed to describe my improved dropper in detail.

In the construction illustrated, the dropper is made principally of cast iron and comprises a seed hopper 15 whose lower end is formed into a tapering downwardly inclined passage whose bottom has been indicated by numeral 16 and whose side walls are designated by numeral 17 and 18. This passage terminates in an opening surrounded at the top and sides by a flange 19. The flange on the lower side has been designated by numeral 20 and has forwardly directed feet 21 that are perforated for the reception of the securing bolts 13. A bracket 122 has its lower end secured to the frame 1 and its upper end secured to the underside of the seed hopper.

Projecting downwardly from the underside of the seed hopper are two spaced ribs 22 and 23 whose forward ends are provided with bearings 24 and 25 for the reception of the shaft 26. One end of the shaft 26 has a disk 27 provided with a crank pin 28, while the other end has secured to it a sprocket wheel 29. Pivotally secured to the pivot pin 30 is an air compressor or pump 31 whose piston rod 32 is connected to the pin 28 so that when the shaft 26 is rotated the piston rod will be reciprocated. As the pump 31 is constructed in the manner usually employed in the construction of simple pumps of this type it will not be described in detail. A pipe 33 communicates with the interior of the pump and carries a check valve 34 from the upper end of which a pipe 35 projects and to this the lower end of the tube 36 is connected. A plate 37 is secured to the flanges 19, 20 by means of bolts 38. The plate 37 has a transverse rearwardly extending rib 39 provided with a notch 40. A bearing 41 is provided midway between the ends of the rib 39 and rotatably mounted in this bearing is a shaft 42 to the rear end of which the bevel gear 43 is nonrotatably secured. Formed integral with the rib 39 are bearings 44 and 45 whose axis intersects the axis of the shaft 42. A shaft 46 is rotatably mounted in the bearings 44 and 45 and has secured to opposite ends thereof sprocket wheels 47 and 48. A gear 49 is nonrotatably connected to shaft 46 at a point between the bearings 39 and 40 and meshes with the gear 43 so that this gear and the shaft 41 will be rotated whenever the shaft 46 rotates. Since the sprocket wheel 29 is connected to the sprocket wheel 48 by means of a chain 50, it is evident that the pump 31 will be operated whenever shaft 46 rotates. Secured to the front end of the shaft 42 is a disk 51 that has a plurality of openings 52. A plate 53 is secured in place against the inner face of the disk 51; this plate has a central opening that is bounded by a circular wall 54 for the greater portion of its circumference and is of such size that the openings 52 are within the opening throughout the entire extent of its arcuate portion which extends from the point $x$ to $y$. Between points $x$ and $y$ the opening is bounded by a compound curve $x$ $z$ $y$ so related to the center of the disk 51 that the holes will covered as they move from $y$ to $x$. The plate 53 has been shown as secured in place by means of screws 55 but may be secured to the hopper in any other way. That portion of the plate 53 which lies beyond the part of the curve indicated by $z$ is provided with an opening 56 which is connected by means of the L 57 with the pipe 58 to which reference will be made hereinafter. An opening 59 is provided in the plate 37 in axial alignment with the opening 57 (Fig. 4) and this is placed in communication with the interior of the pipe 60 whose lower end terminates within the tubular member 12. Let us now suppose that the disk 51 is rotated in the direction of the arrow (Fig. 6). The holes 52 will successively come into alignment with the openings 57 and 59 (Fig. 4). During operation the hopper is filled with beet seed some of which are in contact with the inner surface of the rotatable disk 51. As this disk rotates, beet seeds will enter the openings 52 each of which will accommodate from three to five seeds. When any one of the holes 52 come into the position shown in Fig. 4, a quantity of compressed air is admitted into the pipe 58 and this propels the seeds into the opening 59 and downwardly through the tube 60 in the same manner as a shot is propelled from an air gun. The compressed air is obtained from the pump 31 whose delivery port is connected by means of the pipe 36 with an air tight container 61 which serves as a reservoir. The container is provided with a pressure gage 62 and its interior is in communication with the safety valve 63 during operation, although this communication may be closed by means of the valve 64. From the T 65 a pipe 66 extends to and is connected with one side of valve 67 (Fig. 5) whose other side is connected to the end of pipe 58. A check valve 68 which is normally held in closed position by means of a spring 69 prevents air from passing from the pipe 66 to the pipe 58. A lever 70 is pivoted at 71 and rests on the protruding head 72 of the valve member 68. When pressure is applied to the lever 70, the head of the valve member is forced downwardly against the spring 69 and away from the valve seat thereby permitting compressed air to flow into and through the pipe 58 for the purpose of dislodging the seeds from the opening 52 and propelling them through pipe 60 to the seed bed. From Fig. 5 it will be noticed that the wheel 48 is provided with a plurality of pins 73 which move into contact with the upper surface of the lever 70 and open the valve 67. The pins are so positioned that they open the valve 67 just as the holes 52 come into axial alignment with the openings 57 and 59 and keeps the valve open for a short time. The compressed air blows the seeds out of the opening 52 and downwardly through pipe 60. The tank 61 may be secured to the hopper by means of straps 74 or in any other way. As a matter of fact the tank 61 may be secured to the planter at any point and only a single tank and pump are required even if the planter has two or more droppers. It is quite common to provide planters with four droppers so that four rows may be planted at once and in this case only a single pump and tank are needed. The pneumatic action is of great importance in planting beet seed in hills and makes it possible to deposit a number of seeds in properly spaced hills which cannot be done when the compressed air is dispensed with. Owing to the irregular outline of the beet seed, and their light weight, they will not drop as a unit the way corn will, but will be affected by the air currents and retarded unequally in other ways so that even if a number of seeds are released simultaneously from the dropper, they will reach the ground at different times and this is the chief reason why the farmers have been forced to sow the beets in drills instead of in hills.

I want to emphasize the importance of the compressed air means for releasing the seeds and for propelling them through the tube 60 to the ground as this additional element produces an entirely different operation and makes it possible to obtain a result that has heretofore never been successfully achieved. If the hills were to be three or four feet apart, the fact that the seeds would be spread somewhat would make very little difference but when, as in planting beets, the hills are to be spaced only twelve inches or thereabouts, it is evident that if they come straggling they will merely produce the effect of a drill which is undesirable and has been tolerated only because so far no one has ever produced a machine that would satisfactorily plant the seeds in properly spaced hills.

The apparatus illustrated, although it has been successfully operated, is merely intended to illustrate the invention which can obviously be incorporated in machines of many specifically different constructions.

Having now described my invention, what I claim as new is:

1. A beet dropping device comprising, in combination, a hopper provided with an inclined bottom and a vertical wall extending upwardly from the lowest part of the hopper, a shaft mounted for rotation in the hopper, a perforated disk secured to the shaft so as to have one side in contact with one surface of said vertical end wall, a plate secured to the end wall and lying against the other side of the disk, said disk being in communication with the interior of said hopper through an opening which is intersected by the locus of travel of the perforations in said disk, the wall that separates the disk from the interior of the hopper having also a small opening which is intersected by the locus of travel of the perforations in the disk, a source of compressed air connected with said last named opening, a valve mechanism in said air connection, means for rotating the disk and means for opening the valve and permitting a flow of air whenever an opening in the disk comes into alignment with the opening in the wall whereby a blast of air will pass through the perforation and tend to clear the same.

2. A beet seed dropping device comprising, in combination, a hopper provided with an inclined bottom, an end wall extending vertically upwardly from the lowest part of the hopper, a shaft mounted for rotation in said hopper, a perforated disk secured to the shaft so as to have one side in contact with the inner surface of said vertical wall, a plate secured to the end wall and lying against the inside surface of the disk, said plate having a large opening and a small opening, both of said openings being intersected by the locus of travel of the perforations in the disk, means for rotating the disk, a source of compressed air supply, a conduit connecting the air supply with the small opening in the plate and a conduit opening adjacent the outer surface of the disk, the opening in the conduit being in alignment with the small opening in the plate whereby when one of the perforations in the rotatable disk comes into alignment with the small opening in the plate and the opening in the conduit, a blast of air will pass through the openings.

3. A beet seed dropping device comprising, in combination, a hopper open at the top and provided with an inclined bottom, a vertical end wall extending upwardly from the lower end of the hopper, a shaft mounted for rotation in said end wall, a perforated disk secured to the shaft so as to have one side in contact with the inner surface of said vertical wall, a plate secured to the end wall and lying against the inside surface of the disk, said plate having a large opening and a small opening, both of said openings intersecting the locus of the travel of the perforations in the disk, means for rotating the disk with a constant speed, an air pump secured to the hopper structure, means for operating said pump in unison with the disk, a compressed air reservoir, a conduit connecting the reservoir with the pump, a second conduit connecting the reservoir with the small opening in the plate and a conduit opening adjacent the outer surface of the rotatable disk, the opening in the conduit being in alignment with the small opening in the plate whereby when one of the perforations in the rotatable disk comes into line between the small opening in the plate and the opening in the conduit a blast of air will pass through the aligned openings.

4. A beet seed dropping device comprising, in combination, a hopper having an end wall, a shaft mounted for rotation in said hopper, a perforated disk secured to the shaft so as to have one side in contact with the inner surface of said end wall, a plate secured to the end wall and lying against the inside surface of the disk, said plate having a large opening and a small opening, both of said openings being intersected by the locus of travel of the perforations in the disk, means for rotating the disk, a source of compressed air supply, a conduit connecting the air supply with the small opening in the plate and a conduit opening adjacent the outer surface of the disk, the opening in the conduit being in alignment with the small opening in the plate whereby when one of the perforations in the rotatable disk comes into alignment with the small opening in the plate and the opening in the conduit, a blast of air will pass through the openings.

In testimony whereof I affix my signature.

ANDREW A. MATHESON.